United States Patent [19]
Ishibashi

[11] Patent Number: 6,111,964
[45] Date of Patent: Aug. 29, 2000

[54] MICROPHONE DEVICE NAVIGATION SYSTEM, COMMUNICATION DEVICE, AUDIO DEVICE, AND MOTOR VEHICLE

[75] Inventor: Yasuhiro Ishibashi, Tokyo, Japan

[73] Assignee: Sony Corporation, Tokyo, Japan

[21] Appl. No.: 08/927,460

[22] Filed: Sep. 11, 1997

[30] Foreign Application Priority Data

Sep. 27, 1996 [JP] Japan ................................ 8-256645

[51] Int. Cl.$^7$ ........................................ H04B 1/00
[52] U.S. Cl. ........................ 381/86; 381/362; 455/575; 379/454
[58] Field of Search ................... 381/86, 362, 375, 381/383, 365; 379/454, 428, 75; 455/575, 345, 89; 248/549

[56] References Cited

U.S. PATENT DOCUMENTS

| | | | |
|---|---|---|---|
| 4,126,827 | 11/1978 | Negrini | 381/86 |
| 4,215,250 | 7/1980 | Resener | 381/362 |
| 5,081,707 | 1/1992 | Schorman et al. | 381/86 |
| 5,377,949 | 1/1995 | Haan et al. | 238/549 |

*Primary Examiner*—Ping Lee
*Attorney, Agent, or Firm*—Jay H. Maioli

[57] ABSTRACT

A microphone device includes a base adapted to be installed in a given position, an arm mounted on the base for angular movement in a predetermined angular range with respect thereto, and a sound pickup unit mounted on a distal end of the arm for picking up sounds when the arm is angularly positioned at a predetermined angle with respect to the arm. The base may be installed on a pillar positioned obliquely in front of the driver's seat of a motor vehicle, so that the microphone can be held in a good position with respect to the driver. The microphone is positioned in superposed relation or in the vicinity of the pillar that is present in the front vision of the driver on the driver's seat, and hence does not essentially interfere with the front vision of the driver.

26 Claims, 8 Drawing Sheets

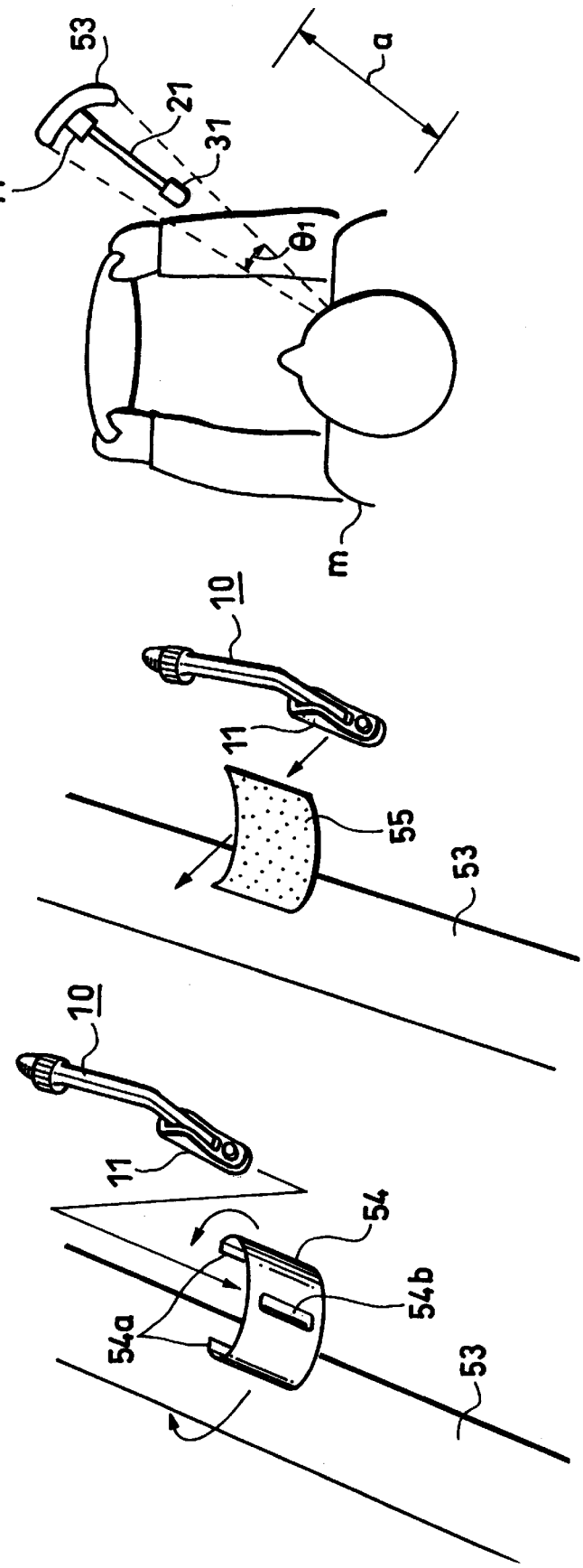

MICROPHONE DEVICE NAVIGATION SYSTEM, COMMUNICATION DEVICE, AUDIO DEVICE, AND MOTOR VEHICLE

BACKGROUND OF THE INVENTION

1. Field of the Invention

The present invention relates to a microphone device mounted in a motor vehicle such as an automobile, a navigation system, a communication device, and an audio device for motor vehicles which employ the microphone device, and a motor vehicle which incorporates the microphone device, the navigation system, the communication device, and the audio device.

2. Description of the Prior Art

Some devices incorporated in motor vehicles such as automobiles need a microphone in order to be used. For example, radio telephone units known as automobile telephone units or portable telephone units for use in automobiles have a microphone mounted in the handset of the radio telephone units. An external microphone may also be attached to the radio telephone unit for picking up voice sounds from the user, typically the automobile driver, and transmitting a voice signal through the radio telephone unit to a calling or called party. The external microphone allows the driver, for example, to talk to the radio telephone unit without holding the handset, and does not interfere with the driving of the automobile.

Devices incorporated in motor vehicles other than the radio telephone units also require the use of a microphone. For example, certain navigation systems for detecting the current position of the automobile and displaying a road map around the detected position are capable of operating in various modes based on control signals entered by way of a speech recognition process. These navigation systems have a microphone installed in the automobile for picking up voice sounds from the user such as the automobile driver. Speech signals generated by the microphone are recognized by a speech recognition unit, which generates control signals for the navigation system based on the recognized speech signals.

The speech recognition process is also applicable to the control of other devices that are incorporated in motor vehicles. For example, audio devices such as car stereo sets may be controlled on the basis of recognized voice sounds that have been picked up by a microphone.

Generally, such a microphone is required to be installed in the passenger compartment of an automobile near the driver's seat for picking up only voice sounds of the driver at a low background noise level from the passenger compartment. It is therefore preferable to position the microphone as closely to the mouth of the driver as possible. According to one microphone installation scheme, the microphone is mounted on the tip end of an arm that extends forward from the head rest on the upper end of the driver's seat. With the microphone on the arm extending from the head rest, the arm is positioned at the side of the mouth of the driver seated on the driver's seat, placing the microphone very close to the mouth of the driver. However, the arm positioned immediately aside of the driver makes the driver uncomfortable on account of the feeling that something foreign is present alongside of the head.

According to other conventional attempts, a microphone is mounted on an instrument panel in front of the driver's seat or on a sun visor positioned upwardly in front of the driver's seat. However, the microphone thus mounted is remote from the mouth of the driver and may not pick up voice sounds at a sufficient sensitivity level.

The distance from the mouth of the driver to the microphone may be reduced by installing the microphone on the tip end of an arm, about several to several tens of centimeters in length, which is mounted on the instrument panel or the sun visor. However, the arm mounted on the instrument panel or the sun visor and the microphone installed on the arm are positioned in the front vision of the driver, also making the driver uncomfortable.

SUMMARY OF THE INVENTION

It is therefore an object of the present invention to allow a microphone installed in the passenger compartment of a motor vehicle to be able to pick up voice sounds at a sufficient sensitivity level and to prevent the microphone from interfering with the driver of the motor vehicle.

A microphone device according to the present invention includes a base adapted to be installed in a given position, an arm mounted on the base for angular movement in a predetermined angular range with respect thereto, and a sound pickup unit mounted on a distal end of the arm for picking up sounds when the arm is angularly positioned at a predetermined angle with respect to the arm. The base may be installed on a pillar positioned obliquely in front of the driver's seat of a motor vehicle, so that the microphone can be held in a good position with respect to the driver. The microphone device is suitable for use in motor vehicles.

With this arrangement, the microphone is positioned in superposed relation or in the vicinity of the pillar that is present in the front vision of the driver on the driver's seat, and hence does not essentially interfere with the front vision of the driver.

BRIEF DESCRIPTION OF THE DRAWINGS

FIG. 5 is a perspective view showing a structure by which the microphone device is installed on the pillar;

FIG. 6 is a perspective view showing another structure by which the microphone device is installed on the pillar;

FIG. 7 is a plan view showing the positional relationship between the driver on the driver's seat and the microphone device installed on the pillar;

DETAILED DESCRIPTION OF THE PREFERRED EMBODIMENT

The principles of the present invention are particularly useful when embodied in a microphone device for use in the passenger compartment of a motor vehicle such as an automobile. A microphone device according to the present invention will be described with reference to FIGS. 1 and 2.

Figure 1:
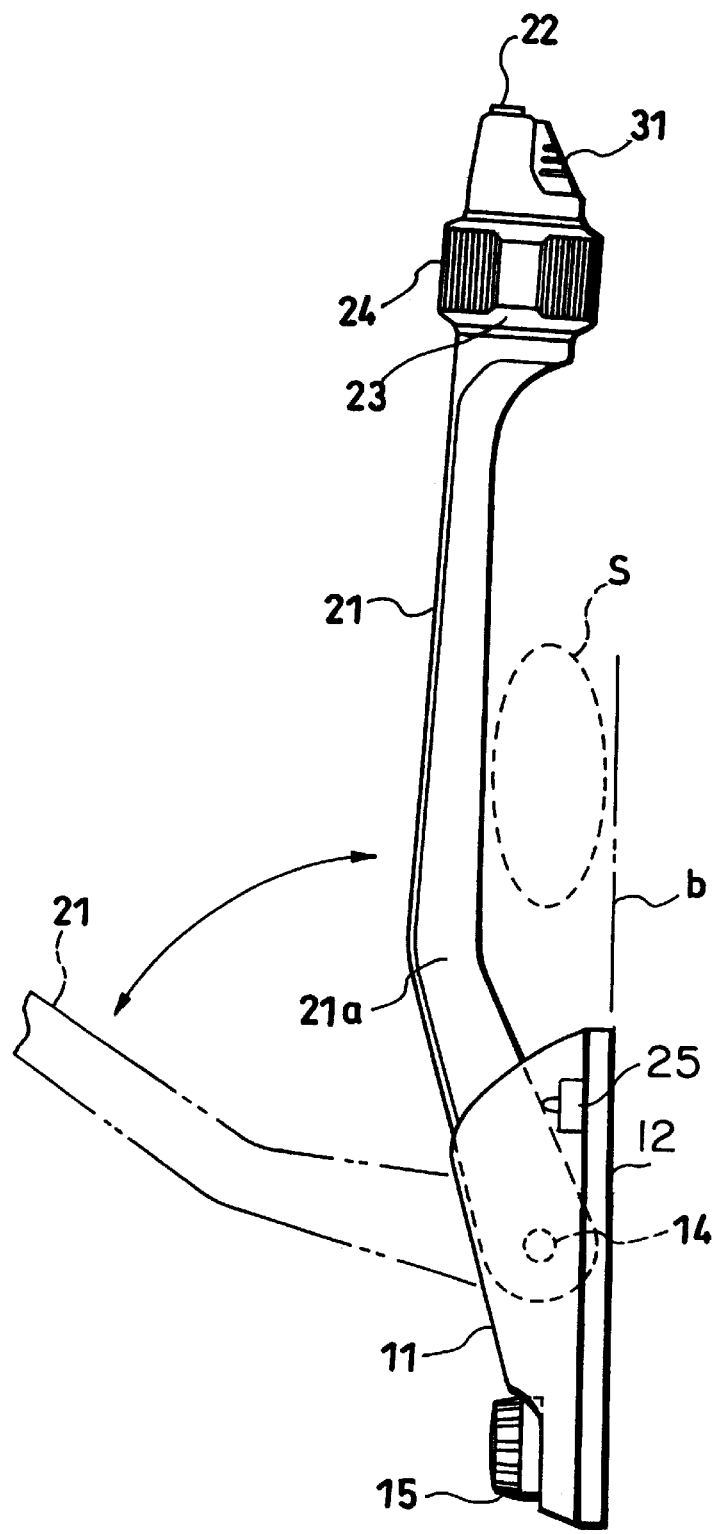
FIG. 1 is a side elevational view of a microphone device according to the present invention.
Figure 2:
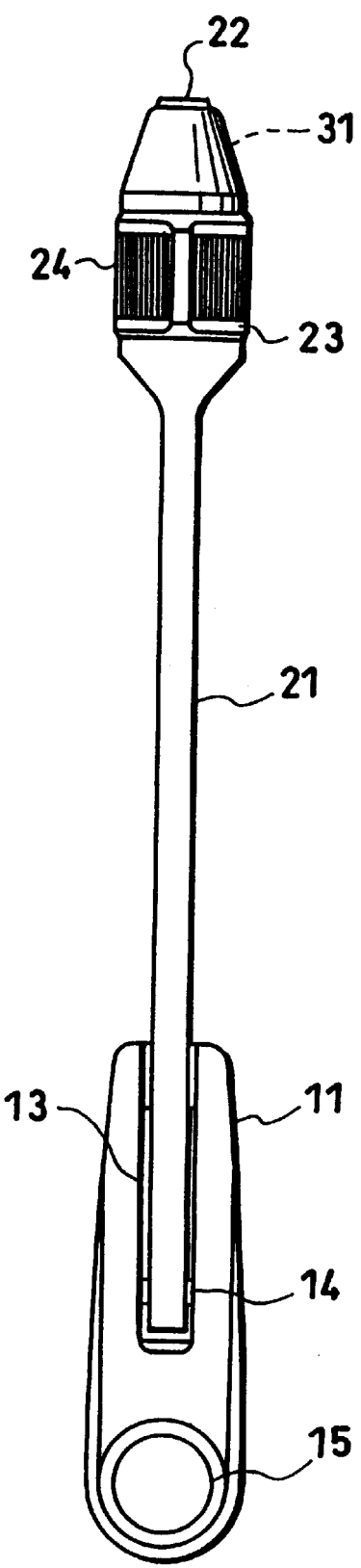
FIG. 2 is a front elevational view of the microphone device.

As shown in FIGS. 1 and 2, the microphone device comprises a base 1 fixedly disposed in a certain installation position, an arm 21 having an end pivotally connected to the base 11, and a microphone 31 mounted on a distal end of the arm 21. As shown in FIG. 2, the microphone device is symmetrical as viewed in plan with respect to its longitudinal axis.

The arm 21 has its pivoted end inserted in a central slot 13 defined in the base 11, and is angularly movable with respect to the base 11 for a predetermined angular range about a pivot shaft 14 that is attached to the pivoted end of the arm 21. The predetermined angular range will be described later on. The arm 21 is made of synthetic resin or metal, and may include a resilient member such as urethane resin covering at least a portion of its surface for dampening shocks produced when other objects hit the arm 21. The base 11 has a control knob 15 of a rotary switch (hereinafter referred to as a "base rotary switch"). When the control knob 15 of the base rotary switch is turned, it controls devices to which the microphone device is electrically connected.

The microphone 31 may comprise a relatively small capacitor or dynamic microphone having a certain directivity pattern such as a relatively narrow directivity pattern. The microphone 31 serves as a sound pickup unit for picking up ambient sounds. Speech signals generated by the microphone 31 are transmitted through signal lines that extend through a space in the arm 21 into the base 11, from which the signal lines are connected to devices in the passenger compartment. Signal lines connected to various switches (described below) of the microphone device also extend through the arm 21 into the base 11, from which they are connected to the devices in the passenger compartment.

A push-button switch 22 is housed in the distal end of the arm 21 on which the microphone 31 is mounted. A distal-end rotary switch 23 is mounted on the arm 21 at a position slightly displaced from the microphone 31 toward the base 11. The distal-end rotary switch 23 has a rotary switch control ring 24 having a knurled outer surface. When the switch control ring 24 is turned, the distal-end rotary switch 23 sends signals to the devices in the passenger compartment. Functions that can be performed by the switches 15, 22, 23 will be described later on.

As shown in FIG. 1, the arm 21 is an angularly bent configuration having a bent corner 21a and includes an arm portion extending from the bent corner 21a toward the distal end of the arm 21 substantially parallel to an installation surface "b" (indicated by the imaginary line in FIG. 1) on which an attachment surface 12 of the base 11 is attached. The arm portion parallel to the installation surface "b", which is parallel to the attachment surface 12 of the base 11, is spaced from the installation surface "b" by a gap "s" that is about 1 cm wide which is large enough to receive a drivers finger.

The arm 21 can be angularly moved approximately 90° about the pivot shaft 14 from the position substantially parallel to the installation surface "b". The arm 21 is detained in the position in which it extends substantially parallel to the installation surface "b" and the position in which it has been angularly pulled approximately 90° in its full angular stroke. In order to turn the arm 21 further from the detained positions, it is necessary to apply a slight force to the arm 21. When a relatively large force is applied to the arm 21 in a direction to turn the arm 21 from the fully pulled position, the arm 21 is turned in that direction. The position in which the arm 21 extends substantially parallel to the installation surface "b" as indicated by the solid lines in FIG. 1 will be referred to as a "stored position", and the position in which it has been angularly pulled approximately 90° in its full angular stroke from the stored position will be referred to as an "operative position".

The base 11 houses a switch which can be turned on and off in response to angular movement of the arm 21. The switch 25 is turned on when the arm 21 is in the operative position, and is turned off in other angular positions. This switch 25 functions as a microphone switch for controlling the microphone 31 to pick up voice sounds and also functions as a switch for controlling the devices to which the microphone device is electrically connected.

Figure 3:
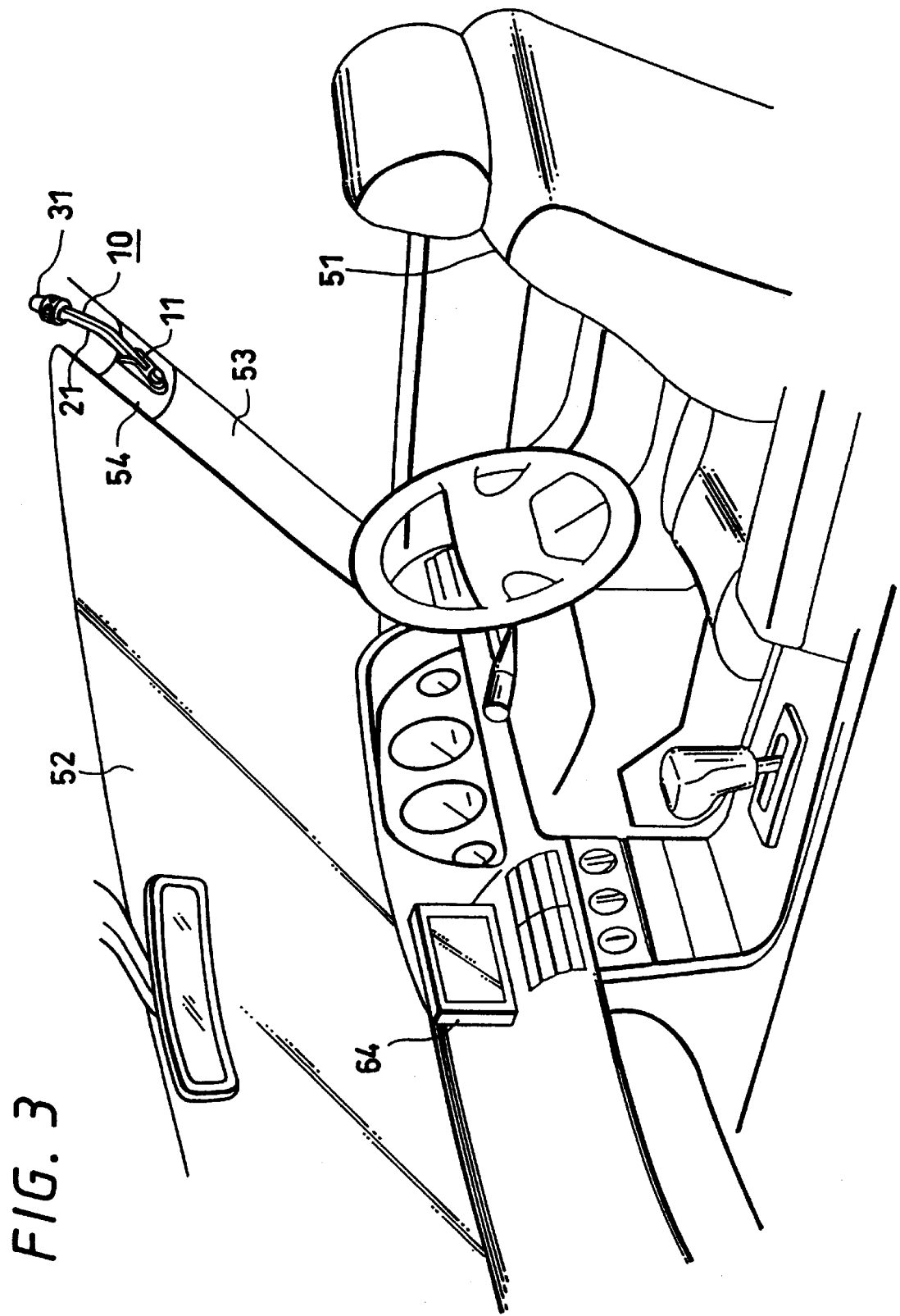
FIG. 3 is a perspective view of a passenger compartment around a driver's seat with the microphone device installed on a pillar.
Figure 4:
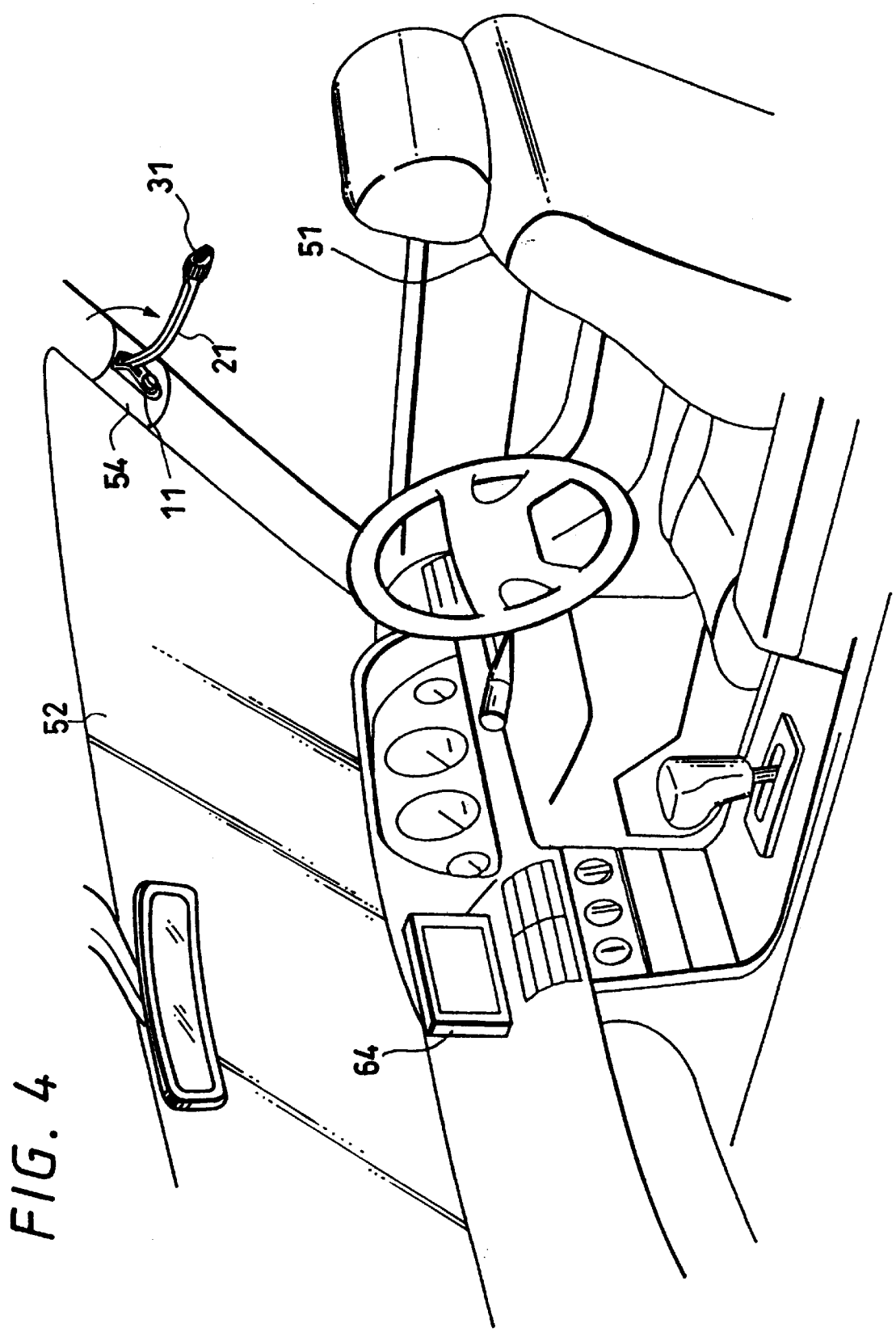
FIG. 4 is a perspective view showing the manner in which the microphone device is in an operative position in the passenger compartment.

The microphone device as it is installed in the passenger compartment of a motor vehicle will be described below with reference to FIGS. 3 through 11. FIGS. 3 and 4 show the microphone device as it is installed in an automobile, FIG. 3 showing the microphone device in the stored position and FIG. 4 showing the microphone device in the operative position. The microphone device is indicated by the reference numeral 10.

FIGS. 3 and 4 illustrate a driver's seat 51 and surroundings in the automobile. A front windshield 52 is positioned forward of the driver's seat 51, and a steering wheel and an instrument panel are disposed on an interior side of the front windshield 52 for the driver on the driver's seat 51 to drive the automobile. Pillars 53 (one shown) that support an automobile roof and the front windshield 52 are positioned one on each side of the front windshield 52. The pillars 53 on the sides of the front windshield 52 are generally called "A pillars", and covered on their interior surfaces with a certain decorative layer.

The microphone device 10 is mounted in a certain position on one of the A pillars 53 which is closer to the driver's seat 51. In FIGS. 3 and 4, the driver's seat 51 is positioned on the right-hand side of the automobile. A microphone attachment 54 is mounted on the right-hand A pillar 53 in front of the driver's seat 51, and the base 11 of the microphone device 10 is installed on the microphone attachment 54.

When the microphone device 10 is in the stored position (FIG. 3), the arm 21 extends substantially parallel to the A pillar 53. In the stored position, the microphone 31 is directed upwardly of the base 11. When the arm 21 is turned about 90° from the stored position into the operative position (FIG. 4), the arm 21 projects substantially perpendicularly to the A pillar 53, with the microphone 31 being positioned close to the mouth of a person who is seated on the driver's seat 51.

FIG. 5 shows a structure by which the microphone device 10 is installed on the A pillar 53. As shown in FIG. 5, the microphone attachment 54 is of a semicircularly curved shape complementarily to the A pillar 53 and has a pair of gripping fingers 54a on its respective opposite ends. The gripping fingers 54a sandwich the A pillar 53 for thereby securing the microphone attachment 54 to the A pillar 53. The microphone attachment 54 may be firmly fixed to the A pillar 53 by an adhesive tape or screws. The microphone attachment 54 has a central engaging tooth 54b for fixing the microphone device 10, and the attachment surface 12 of the base 11 has a recess complementary to the engaging tooth 54b. The engaging tooth 54b is received in the recess in the attachment surface 12, thereby fixing the base 11 to the microphone attachment 54. The base 11 may be firmly fixed to the microphone attachment 54 by an adhesive tape or screws. Electric wires extending from the microphone device 10 extend through the microphone attachment 54 to a rear surface of the A pillar 53 which is not visible from the driver's seat 51, and are electrically connected to the devices in the passenger compartment.

FIG. 6 shows another structure by which the microphone device 10 is installed on the A pillar 53. As shown in FIG. 6, the microphone device 10 is secured to the A pillar 53 by a detachable attachment sheet 55 known as a touch fastener (sold under the tradename "Velcro"). Specifically, the attachment sheet 55 is fixed to the A pillar 53 by an adhesive tape, and the attachment surface 12 of the base 11, which is made of a fibrous material capable of sticking to surface fasteners, is pressed against and joined to the attachment sheet 55.

The positional relationship between the driver and the microphone device 10 when the microphone device 10 fixed to the A pillar 53 is in the operative position will be described below with reference to FIGS. 7 and 8. FIG. 7 shows the positional relationship between the microphone device 10 in the operative position and the driver, represented by "m", seated on the driver's seat, as viewed from above. In FIG. 7, the A pillar 53 is positioned on the right and in front of the driver "m". The microphone device 10 with the arm 21 projecting therefrom is positioned in its entirety within the range of an angle $\theta_1$ of view in which the driver "m" sees the A pillar 53. Therefore, the microphone device 10 is not present as a projecting foreign object within the entire vision of the driver "m" while driving the automobile. The angle $\theta_1$ of view illustrated in FIG. 7 is only for the right eye of the driver "m". The microphone device 10 is also positioned almost in its entirety in the range of an angle of view in which the driver "m" sees the A pillar with the left eye.

Figure 8:
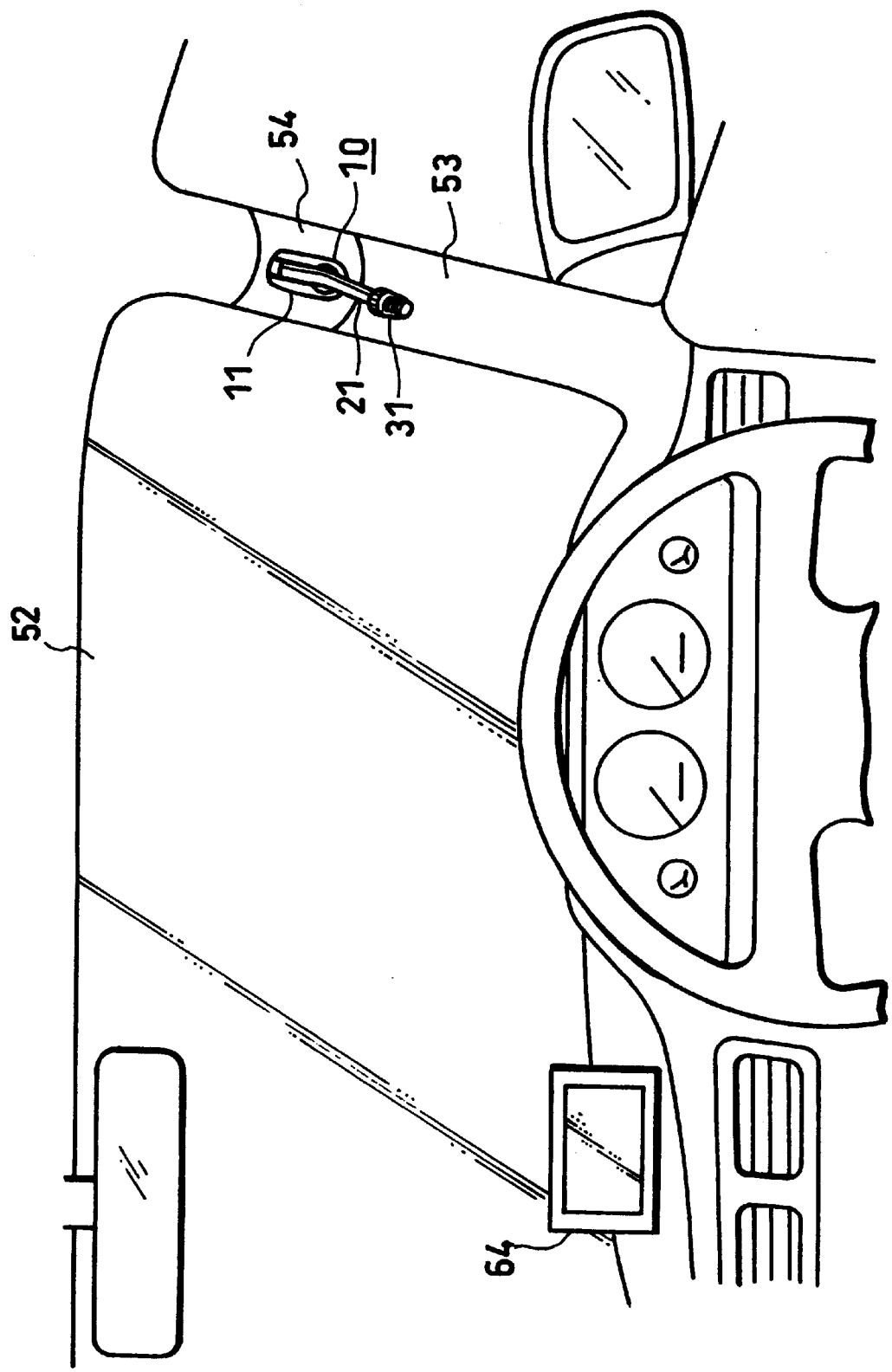
FIG. 8 is a front elevational view showing the microphone device installed on the pillar as viewed from the driver.
Figure 9:
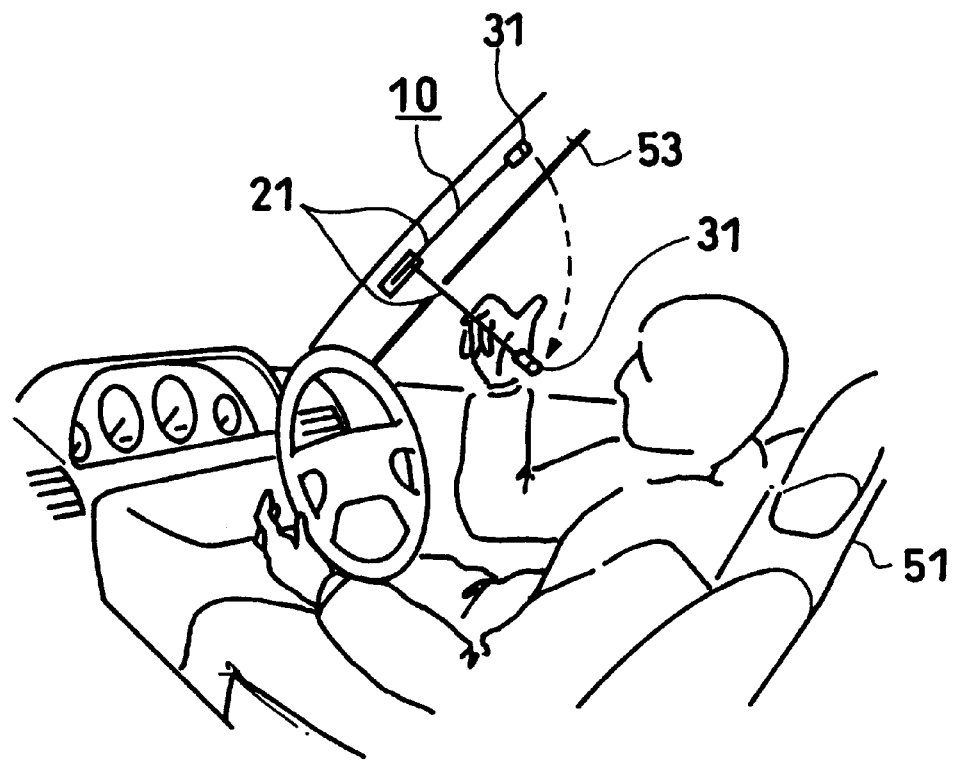
FIG. 9 is a perspective view showing the manner in which the microphone device is used by the driver.

FIG. 8 shows a front field of vision of the driver "m" actually seated on the driver's seat 51. A study of FIG. 8 indicates that the microphone device 10 in the operative position is held within the angle of view in which the driver "m" sees the A pillar. In reality, the driver's seat 51 is movable back and forth and up and down. Since the driver's seat 51 can be positioned for the driver who is seated thereon, the microphone device 10 may be fixed in position within the angle of view in which the driver can see the A pillar 53 most clearly. Alternatively, the microphone device 10 may be fixed to the A pillar 53 with respect to a standard driver's seat position.

With the microphone device 10 fixed to the A pillar 53, the distance "a" (see FIG. 7) from the microphone 31 on the projecting arm 31 in the operative position to the mouth of the driver "m" may be set to about 20 cm. The microphone 31 can thus be positioned very closely to the mouth of the driver "m" for picking up voice sounds from the driver "m" with a good sensitivity level.

The arm 21 may be turned to bring the microphone device 10 from the stored position into the operative position by the driver "m" who pulls the arm 21 with a finger of one hand without interfering with the driving of the automobile. Since the arm 21 is of a bent shape with the gap wide enough to receive at least a finger being left between the arm 21 and the surface of the A pillar 53 that lies parallel to the attachment surface 12, as shown in FIG. 1, the driver "m" can easily pull the arm 21 with a finger inserted into the gap.

Inasmuch as the base 11 houses the switch which can turn on and off the microphone 31 in response to the operation to pull the arm 21, the driver "m" is not required to operate another switch to turn on and off the microphone 31. When the driver "m" simply pulls the arm 21 or pushes back the arm 21, the microphone 31 is automatically turned on to pick up voice sounds or turned off to stop picking up voice sounds. The switch operable in response to the angular movement of the arm 21 may be used to turn on and off a sound processing unit connected to the microphone 31. Such a sound processing unit connected to the microphone 31 will be described later on.

Figure 10:
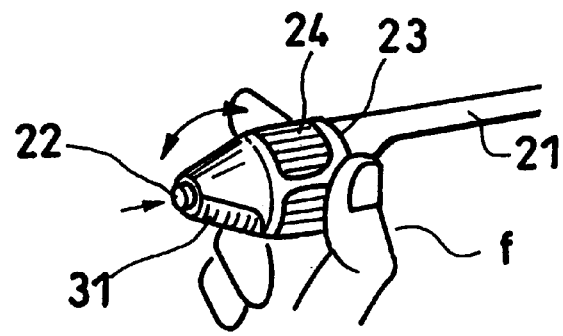
FIG. 10 is a perspective view showing the manner in which the microphone device is operated.

Since the rotary switches and the push-button switch are mounted in various positions on the microphone device 10, the driver "m" can control the devices connected to these switches simply by operating these switches. For example, when the arm 21 is pulled into the operative position, the driver "m" can easily operate the switches 22, 23 around the microphone 31 that is positioned near the mouth of the driver "m". Specifically, as shown in FIG. 10, the driver "m" can easily control the device connected to the distal-end rotary switch 23 by turning the rotary switch control ring 24 on the tip end of the arm 21 with fingers "f". Similarly, the driver "m" can easily control the device connected to the push-button switch 22 by pushing it with a finger "f". The driver "m" can also control the device connected to the base rotary switch 15 by turning it with his fingers "f".

Figure 11:
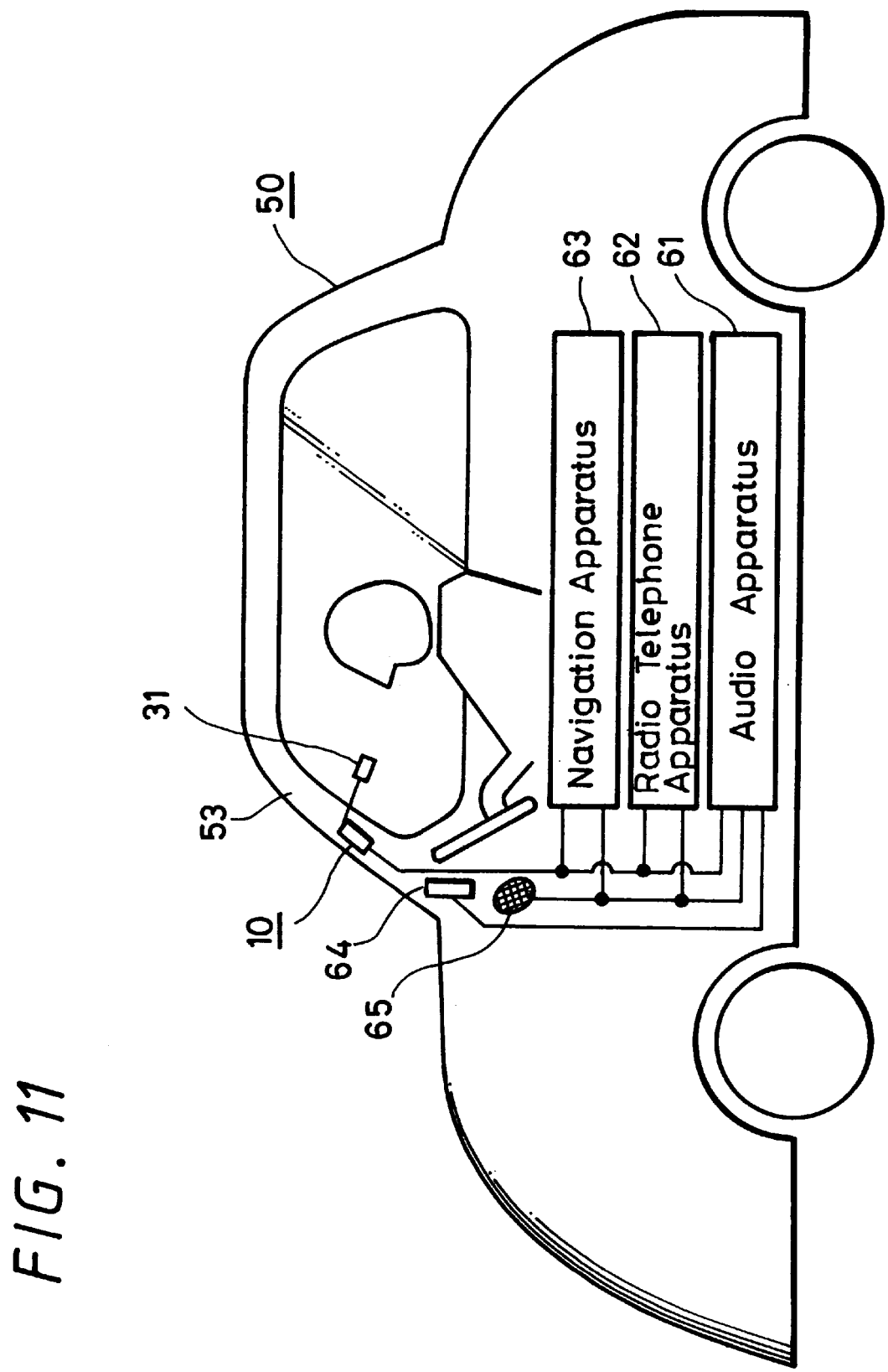
FIG. 11 is a block diagram of an electric circuit arrangement to which the microphone device is connected.

Connections between the microphone device 10 and the devices installed in the automobile will be described below. As shown in FIG. 11, the microphone device 10 is connected to a navigation system 61, a radio telephone device 62, and an audio device 63 which are installed in an automobile 50.

The navigation system 61 detects the current position of the automobile 50 based on radiowaves received from satellites and running conditions of the automobile 50, reads road map information in the vicinity of the detected position from a map information storage medium such as an optical disk, and displays a road map and ancillary information based on the road map information on a display unit 64 which is positioned so as to be visible to the driver. Various navigational operations for selecting geographic regions such as map regions and target positions can be effected according to control signals produced by a speech recognition process. Therefore, the navigation system 61 includes a speech recognition circuit. In a mode in which the microphone device 10 is used as a navigational microphone device, speech signals generated by the microphone 31 are supplied to the speech recognition circuit, which recognizes the supplied speech signals and processes them into control signals for controlling the navigation system 61.

When the microphone device 10 is used as a navigational microphone device of the navigation system 61, the various switches of the microphone device 10 may be used as follows: The speech recognition circuit of the microphone device 10 may be turned on and off by the switch that operates in response to angular movement of the arm 21, so that the speech recognition circuit may be energized only when the microphone device 10 is in the operative position. Modes of operation of the navigation system 61 may be selected by the distal-end rotary switch 23, and a selected mode of operation may be determined by the push-button switch 22. A selected mode of operation may be displayed in the form of characters on the display screen of the display unit 64, or announced by synthesized speech from a loudspeaker 65 in the passenger compartment. Modes of operation that can be selected may include a mode of operation relating to speech recognition and various modes of operation which the navigation system 61 has.

Other modes of operation of the navigation system 61 may be switched around by the base rotary switch 15.

Alternatively, the base rotary switch 15 may be used to change sound pickup characteristics of the microphone 31. Either one of the switches 15, 22, 23 may be used as a switch to change the connection of the microphone device 10 to the devices other than the navigation system 61, i.e., the radio telephone device 62 and the audio device 63.

When the microphone device 10 is used as a navigational microphone device of the navigation system 61, the microphone 31 may not be turned on and off by the switch that operates in response to angular movement of the arm 21, but the microphone 31 and the speech recognition circuit connected thereto may be energized for the speech recognition process only while the push-button switch 22 is being pressed. In this manner, the microphone device 10 may be kept in the operative position as long as the driver is driving the automobile, and the speech recognition process is initiated only when the driver presses the push-button switch 22.

The radio telephone device 62 connected to the microphone device 10 has a radio telephone communication circuit for effecting radio communications with a base station of a radio telephone system to communicate with other parties and transmit data to other parties, and a handset having a control circuit for the radio telephone communication circuit and control keys. The driver can communicate with other parties using the handset. If the radio telephone device is a small unit such as a portable telephone unit, then the handset is integrally combined with the radio telephone device itself. The radio telephone device 62 also has external microphone terminals and external loudspeaker terminals. The microphone device 10 is connected to the external microphone terminals, and the loudspeaker 65, which may be located in a certain position, i.e., near the driver's seat, in the passenger compartment, is connected to the external loudspeaker terminals. The driver can make a hands-free conversation without the handset, using the microphone device 10 and the loudspeaker 65 that are connected to the radio telephone device 62.

In a mode in which the microphone device 10 is connected to the radio telephone device 62, the switch that operates in response to angular movement of the arm 21 is connected to a hook switch of the radio telephone device 62, so that the radio telephone device 62 is in an off-hook state allowing radio communications when the arm 21 is in the operative position, and the radio telephone device 62 is in an on-hook state inhibiting radio communications when the arm 21 is in any of other positions such as the stored position. In this fashion, when there is an incoming call to the radio telephone device 62, the driver can respond to the incoming call simply by turning the arm 21. In this mode in which the microphone device 10 is connected to the radio telephone device 62, the other switches 15, 22, 23 can operate to control the radio telephone device 62. For example, the driver may select a party to be called or adjust the level of voice sounds of calls by turning the distal-end rotary switch 23. When a party to be called is selected by the switch of the microphone device 10, the display unit 64 of the navigation system 61 or another display unit dedicated for the radio telephone device 62 may be used to display the telephone number or name of the selected party.

The audio device 61 connected to the microphone device 10 has audio signal sources comprising a disk playback unit for playing back an optical disc or a magnetooptical disc which stores recorded digital audio signals and a tape playback unit for playing back magnetic tapes, and a radio receiver for receiving broadcasts such as FM broadcasts and AM broadcasts. The audio device 61 processes audio signals outputted from the playback units and the radio receiver through amplification and sound processing such as sound quality and sound field processing, and transmits the processed audio signals to the loudspeaker 65 connected to the audio device 61 for radiating audio sounds. Though only one loudspeaker 65 is illustrated in FIG. 11, there are actually a plurality of loudspeakers, e.g., about 2 to 4 loudspeakers, in the passenger compartment.

The audio device 61 has a speech recognition circuit which recognizes speech signals generated by the microphone device 10, and is controlled on the basis of the recognized speech signals. For example, the driver can turn on and off the audio device 61, change the audio signal sources (i.e., change functions), select discs and tracks to be played back, select a radio station, control the level of audio sounds, and control the quality of audio sounds by entering voice commands into the microphone device 10. In a mode in which the microphone device 10 is connected to the audio device 61, when the arm 21 is in the operative position, the microphone 31 and the speech recognition circuit of the audio device 61 are energized to effect the speech recognition process.

Certain basic operations of the audio device 61 may directly be carried out by the switches of the microphone device 10. For example, the driver can select and change the functions by turning the distal-end rotary switch 23. Speech recognition operations and switch operations may be displayed on the display unit 64 or announced by synthesized speech from the loudspeaker 65. If both the navigation system 63 and the audio device 61 can be controlled by the speech recognition process, then one speech recognition circuit may be shared by the navigation system 63 and the audio device 61. While the audio device 61 simply outputs audio sounds from the loudspeaker in the illustrated embodiment, the audio device 61 may be used as a audio device of an audio/video composite system in which video signals of television broadcasts or the like are displayed on the display unit and audio signals thereof are reproduced by the loudspeaker.

In the above embodiment, the microphone device 10 in the passenger compartment is connected to the navigation system 63, the radio telephone device 62, and the audio device 61. However, the microphone device 10 may be connected to one or two of the navigation system 63, the radio telephone device 62, and the audio device 61 for use as a microphone device thereof. Furthermore, if another device in the passenger compartment than the navigation system 63, the radio telephone device 61, and the audio device 61 needs a microphone device to be combined therewith, then the microphone device 10 may be connected to the other device.

The illustrated microphone device 10 has the switch operable in response to angular movement of the arm 21, the base rotary switch 15, the push-button switch 22, and the distal-end rotary switch 23. However, any of these switches may be dispensed with, or none of these switches may be provided on the microphone device 10.

The illustrated microphone 31 on the tip end of the arm 21 comprises a general microphone from which speech signals are transmitted over signal wires. However, the microphone 31 may comprise a wireless microphone for transmitting speech signals by way of infrared radiation or radio waves.

In the illustrated embodiment, the driver's seat is positioned on the right-hand side of the automobile, and the microphone device 10 is mounted on the right-hand A pillar in front of the driver's seat. However, if the driver's seat is positioned on the left-hand side of the automobile, then the microphone device 10 may be mounted on the lefthand A pillar. Since the microphone device 10 is symmetrical in shape with respect to its longitudinal axis, the microphone device 10 is applicable to either the right-hand A pillar or the left-hand A pillar.

While the microphone device 10 is installed in an automobile in the illustrated embodiment, the microphone device 10 may be installed in any of various other motor vehicles.

The present invention offers the following advantages:

A microphone device according to the present invention includes a base adapted to be installed in a given position, an arm mounted on the base for angular movement in a predetermined angular range with respect thereto, and a sound pickup unit mounted on a distal end of the arm for picking up sounds when the arm is angularly positioned at a predetermined angle with respect to the arm. The base may be installed on a pillar positioned obliquely in front of the driver's seat of a motor vehicle, so that the microphone can be held in a good position with respect to the driver. The microphone device is suitable for use in motor vehicles.

The microphone device further includes switch means mounted on the arm closely to the sound pickup unit, for effecting a predetermined operation. Therefore, an operation relative to the processing of voice sounds picked up by the microphone can be carried out by moving the arm. The microphone device can thus be operated with efficiency.

The microphone device further includes a resilient member covering at least a portion of the arm. The resilient member is effective to dampen shocks produced when a foreign object hits the arm.

According to the present invention, a navigation system in a motor vehicle for guiding a position of the motor vehicle, the motor vehicle having a driver's seat and a pillar positioned obliquely in front of the driver's seat, includes a speech recognition unit for recognizing voice sounds to control the navigation system, and a microphone mounted on the pillar for picking up a voice sound and transmitting a speech signal based on the voice sound to the speech recognition unit. The microphone can pick up voice sounds from the driver on the driver's seat without interfering the driving of the motor vehicle, and allows voice sounds to be easily sent to the speech recognition unit.

In the navigation system, the microphone comprises a base installed on the pillar, an arm mounted on the base for angular movement in a predetermined angular range with respect thereto, and a sound pickup unit mounted on a distal end of the arm. When the microphone is used, the sound pickup unit can be brought closely to the driver by turning the arm for picking up voice sounds from the driver. When the microphone is not in use, the arm is turned to a position substantially parallel to the pillar, and is stored without projecting from the pillar and hence disturbing the driver.

In the navigation system, the sound pickup unit is energizable to pick up a voice sound when the arm is angularly positioned most remotely from the pillar. The sound pickup unit is automatically turned on and off in response to angular movement of the arm. Therefore, the speech recognition process of the navigation system can be turned on and off simply when the arm is turned.

In the navigation system, the arm is spaced a predetermined gap from the pillar when the arm is angularly positioned substantially parallel to the pillar. When the arm is to be pulled, the driver can insert a finger into the gap for easily pulling the arm.

The navigation system further comprises switch means mounted on the arm closely to the sound pickup unit, for effecting a predetermined operation on the navigation system. Therefore, an operation on the navigation system can be carried out by moving the arm. The navigation system can thus be operated with efficiency.

In the navigation system, the arm and the sound pickup unit are located substantially within the width of the pillar as viewed from a driver seated on the driver's seat when the arm is angularly positioned most remotely from the pillar. Consequently, the microphone does not project as a foreign object into the vision of the driver, and hence does not interfere with the vision of the driver.

In the navigation system, the arm is angularly movable out of the predetermined angular range when subjected to an external force beyond a predetermined level. Therefore, the microphone is prevented from being damaged when the driver hits the arm that projects from the pillar.

According to the present invention, a communication device in a motor vehicle for effecting radio communications with a radio station, the motor vehicle having a driver's seat and a pillar positioned obliquely in front of the driver's seat, comprises a microphone mounted on the pillar for picking up a voice sound and processing the voice sound for transmission to the radio station through radio communications. The microphone can pick up voice sounds from the driver on the driver's seat without interfering with the driving of the motor vehicle, and allows the driver to make car telephone calls, for example, smoothly and efficiently.

In the communication device, the microphone comprises a base installed on the pillar, an arm mounted on the base for angular movement in a predetermined angular range with respect thereto, and a sound pickup unit mounted on a distal end of the arm. When the microphone is used, the sound pickup unit can be brought closely to the driver by turning the arm for picking up voice sounds from the driver. When the microphone is not in use, the arm is turned to a position substantially parallel to the pillar, and is stored without projecting from the pillar and hence disturbing the driver.

The communication device further comprises a hook switch for controlling the radio communications, the hook switch being selectively energizable and de-energizable in response to angular movement of the arm. The driver on the driver's seat can start and end radio communications without separately operating the hook switch. The microphone of the communication device is thus operable with high efficiency.

In the communication device, the sound pickup unit is being selectively energizable and de-energizable in response to energization and de-energization of the hook switch. As a result, the microphone does not need to be turned on and off by itself, and hence can be operated highly efficiently.

In the communication device, the arm is spaced a predetermined gap from the pillar when the arm is angularly positioned substantially parallel to the pillar. When the arm is to be pulled, the driver can insert a finger into the gap for easily pulling the arm.

The communication device further comprises switch means mounted on the arm closely to the sound pickup unit, for effecting a predetermined operation on the radio communications. Therefore, an operation on the radio communications can be carried out by moving the arm. The communication device can thus be operated with efficiency.

In the communication device, the arm and the sound pickup unit are located substantially within the width of the pillar as viewed from a driver seated on the driver's seat when the arm is angularly positioned most remotely from the pillar. Consequently, the microphone does not project as a foreign object into the vision of the driver, and hence does not interfere with the vision of the driver.

In the communication device, the arm is angularly movable out of the predetermined angular range when subjected to an external force beyond a predetermined level. Therefore, the microphone is prevented from being damaged when the driver hits the arm that projects from the pillar.

According to the present invention, an audio device in a motor vehicle for outputting an audio signal from an audio signal source through a loudspeaker, the motor vehicle having a driver's seat and a pillar positioned obliquely in front of the driver's seat, includes a speech recognition unit for recognizing a voice sound to control the audio signal, and a microphone mounted on the pillar for picking up a voice sound and transmitting a speech signal based on the voice sound to the speech recognition unit. The microphone can pick up voice sounds from the driver on the driver's seat without interfering with the driving of the motor vehicle, and allows voice sounds to be easily sent to the speech recognition unit.

In the audio device, the microphone comprises a base installed on the pillar, an arm mounted on the base for angular movement in a predetermined angular range with respect thereto, and a sound pickup unit mounted on a distal end of the arm. When the microphone is used, the sound pickup unit can be brought closely to the driver by turning the arm for picking up voice sounds from the driver. When the microphone is not in use, the arm is turned to a position substantially parallel to the pillar, and is stored without projecting from the pillar and hence disturbing the driver.

In the audio device, the sound pickup unit is energizable to pick up a voice sound when the arm is angularly positioned most remotely from the pillar. The sound pickup unit is automatically turned on and off in response to angular movement of the arm. Therefore, the speech recognition process of the audio device can be turned on and off simply when the arm is turned.

In the audio device, the arm is spaced a predetermined gap from the pillar when the arm is angularly positioned substantially parallel to the pillar. When the arm is to be pulled, the driver can insert a finger into the gap for easily pulling the arm.

The audio device further comprises switch means mounted on the arm closely to the sound pickup unit, for effecting a predetermined operation on audio signals to be outputted from the audio device. Therefore, an operation on the audio signals can be carried out by moving the arm. The audio device can thus be operated with efficiency.

In the audio device, the arm and the sound pickup unit are located substantially within the width of the pillar as viewed from a driver seated on the driver's seat when the arm is angularly positioned most remotely from the pillar. Consequently, the microphone does not project as a foreign object into the vision of the driver, and hence does not interfere with the vision of the driver.

In the audio device, the arm is angularly movable out of the predetermined angular range when subjected to an external force beyond a predetermined level. Therefore, the microphone is prevented from being damaged when the driver hits the arm that projects from the pillar.

According to the present invention, a motor vehicle comprises a driver's seat, a pillar positioned obliquely in front of the driver's seat, a sound processing unit, and a microphone mounted on the pillar for picking up a voice sound and transmitting a speech signal based on the voice sound to the sound processing unit. The microphone can pick up voice sounds from the driver on the driver's seat without interfering with the driving of the motor vehicle, and allows voice sounds to be easily sent for sound processing.

In the motor vehicle, the microphone comprises a base installed on the pillar, an arm mounted on the base for angular movement in a predetermined angular range with respect thereto, and a sound pickup unit mounted on a distal end of the arm. When the microphone is used, the sound pickup unit can be brought closely to the driver by turning the arm for thereby picking up voice sounds from the driver. When the microphone is not in use, the arm is turned to a position substantially parallel to the pillar, and is stored without projecting from the pillar and hence disturbing the driver.

In the motor vehicle, the sound pickup unit is energizable to pick up a voice sound when the arm is angularly positioned most remotely from the pillar. The sound pickup unit is automatically turned on and off in response to angular movement of the arm. Therefore, the sound processing can be turned on and off simply when the arm is turned.

The motor vehicle further comprises switch means mounted on the arm closely to the sound pickup unit, for effecting a predetermined operation on voice sounds that are picked up. Therefore, an operation on the voice sounds can be carried out by moving the arm. The motor vehicle can thus be operated with efficiency.

In the motor vehicle, the microphone includes a resilient member covering at least a portion of the arm. The resilient member is effective to dampen shocks produced when a foreign object hits the arm.

In the motor vehicle, the arm is spaced a predetermined gap from the pillar when the arm is angularly positioned substantially parallel to the pillar. When the arm is to be pulled, the driver can insert a finger into the gap for easily pulling the arm.

In the motor vehicle, the arm and the sound pickup unit are located substantially within the width of the pillar as viewed from a driver seated on the driver's seat when the arm is angularly positioned most remotely from the pillar. Consequently, the microphone does not project as a foreign object into the vision of the driver, and hence does not interfere with the vision of the driver.

In the motor vehicle, the arm is angularly movable out of the predetermined angular range when subjected to an external force beyond a predetermined level. Therefore, the microphone is prevented from being damaged when the driver hits the arm that projects from the pillar.

Having a described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A navigation system in a motor vehicle for guiding a position of the motor vehicle having a driver's seat and a pillar positioned obliquely in front of the driver's seat, comprising:

a speech recognition unit for recognizing sounds from a driver to control the navigation system; and a microphone assembly pivotally mounted on the pillar for movement between a first position substantially parallel to the pillar and a second position substantially perpendicular to the pillar, wherein the microphone assemble in the second position does not interfere with the vision of a driver in the driver's seat, for picking up a voice sound from the driver and transmitting a speech signal based on the voice sound to said speech recognition unit, wherein the microphone assembly includes a base mounted on the pillar, an arm pivotally attached at one end to the base, a sound pickup unit mounted on another end of the arm, and a switch housed in said base, whereby the microphone is energized to pick up the voice sound when the arm is angularly positioned in the second position most remotely from said pillar.

2. The navigation system according to claim 1, wherein said microphone assembly further comprises:
   said base installed on said pillar;
   said arm mounted on said base for angular movement over a predetermined angular range with respect to said base; and
   said sound pickup unit mounted on a distal end of said arm.

3. The navigation system according to claim 2, wherein said arm is spaced apart by a predetermined distance from said pillar to form a gap when said arm is angularly positioned substantially parallel to said pillar.

4. The navigation system according to claim 2, wherein said microphone assembly further comprises switch means mounted on said arm proximate said sound pickup unit for effecting a predetermined operation on the navigation system upon manual actuation thereof.

5. The navigation system according to claim 2, wherein said arm and said sound pickup unit are located substantially within a space defined by a width of said pillar as viewed from the driver seated on the driver's seat when said arm is angularly positioned most remotely from said pillar.

6. The navigation system according to claim 2, wherein said arm is angularly movable out of said predetermined angular range when subjected to an external force beyond a predetermined level.

7. A communication device in a motor vehicle for effecting radio communications with a radio station, the motor vehicle having a driver's seat and a pillar positioned obliquely in front of the driver's seat, the device comprising:
   a microphone assembly pivotally mounted on the pillar for movement between a first position substantially parallel to the pillar and a second position substantially perpendicular to the pillar, wherein the microphone assembly in the second position does not interfere with the vision of a driver in the driver's seat, for picking up a voice sound from a driver and processing the voice sound for transmission to the radio station through radio communications; and
   wherein the microphone assembly includes a base mounted on the pillar, an arm pivotally attached at one end to the base, and a telephone hook switch housed in said base for controlling communication which is activated in response to movement of the arm into the second position.

8. The communication device of according to claim 7, wherein said microphone assembly further comprises:
   said base installed on said pillar
   said arm mounted on said base for angular movement over a predetermined angular range with respect to said base; and
   a sound pickup unit mounted on a distal end of said arm.

9. The communication device according to claim 8 wherein said sound pickup unit is selectively energized and de-energized in response to said activation of said hook switch.

10. The communication device according to claim 8, wherein said arm is spaced apart by a predetermined distance from said pillar to form a gap when said arm is angularly positioned substantially parallel to said pillar.

11. The communication device according to claim 8, wherein said microphone assembly further comprises switch means mounted on said arm proximate said sound pickup unit for effecting a predetermined operation on the radio communications upon manual actuation thereof.

12. The communication device according to claim 8, wherein said arm and said sound pickup unit are located substantially within a space defined by a width of said pillar as viewed from the driver seated on the driver's seat when said arm is angularly positioned most remotely from said pillar.

13. The communication device according to claim 8, wherein said arm is angularly movable out of said predetermined angular range when subjected to external forces beyond a predetermined level.

14. An audio device in a motor vehicle for outputting an audio signal from an audio signal source through a loudspeaker, the motor vehicle having a driver's seat and a pillar positioned obliquely in front of the driver's seat, the device comprising:
   a speech recognition unit for recognizing a voice sound from a driver to control the audio signal; and
   a microphone assembly pivotally mounted on the pillar for movement between a first position substantially parallel to the pillar and a second position substantially perpendicular to the pillar, wherein the microphone the assembly in the second position does not interfere with the vision of a driver in the driver's seat, for picking up the voice sound and transmitting a speech signal based on the voice sound to said speech recognition unit, wherein
   the microphone assembly includes a base mounted on the pillar, an arm pivotally attached at one end to the base, a sound pickup unit mounted-on another end of the arm, and a switch housed in said base, whereby the microphone is energized to pick up the voice sound when said arm is positioned in the second position most remotely from said pillar.

15. The audio device according to claim 14, wherein said microphone assembly further comprises:
   said base installed on the pillar;
   said arm mounted on said base for angular movement over a predetermined angular range with respect to said base; and
   said sound pickup unit mounted on a distal end of said arm.

16. The audio device according to claim 15, wherein said arm is spaced apart by a predetermined distance from said pillar to form a gap when said arm is angularly positioned substantially parallel to said pillar.

17. The audio device according to claim 15, wherein said microphone assembly further comprises switch means mounted on said arm proximate said sound pickup unit for effecting a predetermined operation on the audio signal upon manual actuation thereof.

18. The audio device according to claim 15, wherein said arm and said sound pickup unit are located substantially within a space defined by a width of said pillar as viewed from the driver seated on the driver's seat when said arm is angularly positioned most remotely from said pillar.

19. The audio device according to claim 15, wherein said arm is angularly movable out of said predetermined angular range when subjected to an external force beyond a predetermined level.

20. A motor vehicle comprising:
   a driver's seat;

a pillar positioned obliquely in front of said driver's seat;

a sound processing unit; and a microphone assembly pivotally mounted on the pillar for movement between a first position substantially parallel to the pillar and a second position substantially perpendicular to the pillar, wherein the microphone assembly in the second position will not interfere with the vision of a driver in the driver's seat, for picking up a voice sound from a driver and transmitting a speech signal based on the voice sound to said sound processing unit; wherein the microphone assembly includes a base mounted on the pillar, an arm pivotally attached at one end to the base, a sound pickup unit mounted on another end of the arm, and a switch housed in said base, whereby the microphone is energized to pick up the voice sound when the arm is angularly positioned in the second position most remotely from said pillar.

21. The motor vehicle according to claim 20, wherein said microphone assembly further comprises:

said base installed on said pillar;

said arm mounted on said base for angular movement over a predetermined angular range with respect to said base; and said sound pickup unit mounted on a distal end of said arm.

22. The motor vehicle according to claim 21, wherein said microphone assembly further comprises switch means mounted on said arm proximate said sound pickup unit for effecting a predetermined operation.

23. The motor vehicle according to claim 21, further comprising a resilient member covering at least a portion of said arm.

24. The motor vehicle according to claim 21, wherein said arm is spaced apart by a predetermined distance from said pillar to form a gap when said arm is angularly positioned substantially parallel to said pillar.

25. The motor vehicle according to claim 21, wherein said arm and said sound pickup unit are located substantially within a space defined by a width of said pillar as viewed from the driver seated on the driver's seat when said arm is angularly positioned most remotely from said pillar.

26. The motor vehicle according to claim 21, wherein said arm is angularly movable out of said predetermined angular range when subjected to an external force beyond a predetermined level.

* * * * *